(12) United States Patent
Higuchi et al.

(10) Patent No.: US 11,421,058 B2
(45) Date of Patent: Aug. 23, 2022

(54) MODIFIED POLYTETRAFLUOROETHYLENE AND METHOD FOR PRODUCING SAME

(71) Applicant: AGC Inc., Chiyoda-ku (JP)

(72) Inventors: Shinya Higuchi, Chiyoda-ku (JP); Masahiro Takazawa, Chiyoda-ku (JP); Takehiro Kose, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 109 days.

(21) Appl. No.: 16/684,637

(22) Filed: Nov. 15, 2019

(65) Prior Publication Data

US 2020/0095353 A1  Mar. 26, 2020

Related U.S. Application Data

(63) Continuation of application No. PCT/JP2018/020575, filed on May 29, 2018.

(30) Foreign Application Priority Data

Jun. 2, 2017 (JP) ............................. JP2017-110318

(51) Int. Cl.
  *C08F 214/18* (2006.01)
  *H01B 3/44* (2006.01)
  *C08F 214/26* (2006.01)
  *H01B 7/02* (2006.01)

(52) U.S. Cl.
  CPC ...... *C08F 214/182* (2013.01); *C08F 214/262* (2013.01); *H01B 3/445* (2013.01); *H01B 7/02* (2013.01)

(58) Field of Classification Search
  CPC .................. C08F 214/182; C08F 214/262
  See application file for complete search history.

(56) References Cited

U.S. PATENT DOCUMENTS

| 5,731,394 | A   |   | 3/1998  | Treat et al. |
| 7,531,611 | B2  | * | 5/2009  | Sabol ................ C08F 214/26 428/502 |
| 2008/0281067 | A1 | * | 11/2008 | Nanba ............... C08F 259/08 526/255 |
| 2018/0037689 | A1 | * | 2/2018  | Kobayashi ............ H01B 13/00 |

FOREIGN PATENT DOCUMENTS

| JP | 11-509245 A | 8/1999 |
| JP | 2015232082 A * | 12/2015 |
| RU | 2 575 009 C2 | 2/2016 |
| WO | WO 2016/170918 A1 | 10/2016 |
| WO | WO 2017/043448 A1 | 3/2017 |

OTHER PUBLICATIONS

International Search Report dated Jul. 24, 2018 in PCT/JP2018/020575 filed on May 29, 2018.

\* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

A modified polytetrafluoroethylene which can be formed under a low extrusion pressure and with which changes of the extrusion pressure are suppressed, even in paste extrusion at a high RR ratio, and its production method. The modified polytetrafluoroethylene having units based on tetrafluoroethylene, 0.020 to 0.040 mass % of units based on a monomer represented by the following formula (1), and 0.003 to 0.080 mass % of units based on a monomer represented by the following formula (2), each based on all units of the modified polytetrafluoroethylene. The monomers of formulae (1) and (2) are represented by: $CH_2=CH-C_nF_{2n+1}$ (1), wherein n is from 2 to 6; and $CF_2=CFO(LO)_mRf$ (2), wherein L is a perfluoroalkylene group, Rf is a perfluoroalkyl group, and m is an integer of from 0 to 4.

17 Claims, 1 Drawing Sheet

MODIFIED POLYTETRAFLUOROETHYLENE AND METHOD FOR PRODUCING SAME

TECHNICAL FIELD

The present invention relates to a modified polytetrafluoroethylene, a method for producing it, a formed product, an electric wire covering material, and an electric wire.

BACKGROUND ART

Polytetrafluoroethylene (hereinafter referred to as PTFE) has been used for various applications making use of its excellent properties. Usually, when PTFE is to be formed into a tube, a filter or the like, paste extrusion is employed.

A method has been known for modifying PTFE by using a small amount of a monomer copolymerizable with tetrafluoroethylene (hereinafter sometimes referred to as TFE), so as to improve forming property when PTFE is subjected to paste extrusion. Patent Document 1 discloses a modified PTFE fine powder obtained by copolymerizing a perfluoro(alkyl)ethylene, a fluoro(alkyl) vinyl ether) and TFE.

PRIOR ART DOCUMENTS

Patent Documents

Patent Document 1: JP-A-H11-509245

DISCLOSURE OF INVENTION

Technical Problem

On the other hand, in recent years, it is required that a formed product can be obtained under a lower extrusion pressure even at a high reduction ratio (hereinafter sometimes referred to as RR ratio) and that changes of the extrusion pressure at the time of extrusion are more suppressed, at the time of paste extrusion. The RR ratio is also called a draw ratio, and represents a ratio of an inlet port area to an exhaust port area of an extruder.

The present inventors have conducted extensive studies on properties of the modified PTFE as disclosed in Patent Document 1 and as a result, found it difficult to satisfy both low extrusion pressure and suppression of changes of the extrusion pressure, at the time of paste extrusion at a high RR ratio.

It is an object of the present invention to provide a modified polytetrafluoroethylene (modified PTFE) which can be formed under a lower extrusion pressure and with which changes of the extrusion pressure can be suppressed, even in paste extrusion at a high RR ratio.

Another object of the present invention is to provide a method for producing the modified PTFE, a formed product, an electric wire covering material, and an electric wire.

Solution to Problem

The present inventors have conducted extensive studies to achieve the above objects and as a result, found that the above objects can be achieved by the invention having the following embodiments.

(1) A modified polytetrafluoroethylene having units based on tetrafluoroethylene, units based on a monomer represented by the following formula (1) and units based on a monomer represented by the following formula (2),
wherein the content of the units based on the monomer represented by the formula (1) is from 0.020 to 0.040 mass % to all units of the modified polytetrafluoroethylene, and
the content of the units based on the monomer represented by the formula (2) is from 0.003 to 0.080 mass % to all units of the modified polytetrafluoroethylene:

$$CH_2=CH-C_nF_{2n+1} \qquad (1)$$

wherein n is an integer of from 2 to 6;

$$CF_2=CFO(LO)_mRf \qquad (2)$$

wherein L is a perfluoroalkylene group, Rf is a perfluoroalkyl group, and m is an integer of from 0 to 4.

(2) The modified polytetrafluoroethylene according to the above (1), wherein the content of the units based on the monomer represented by the formula (1) is from 0.020 to 0.030 mass % to all units of the modified polytetrafluoroethylene, and
the content of the units based on the monomer represented by the formula (2) is from 0.004 to 0.008 mass % to all units of the modified polytetrafluoroethylene.

(3) The modified polytetrafluoroethylene according to the above (1), wherein the content of the units based on the monomer represented by the formula (1) is from 0.020 to 0.027 mass % to all units of the modified polytetrafluoroethylene, and
the content of the units based on the monomer represented by the formula (2) is from 0.004 to 0.007 mass % to all units of the modified polytetrafluoroethylene.

(4) The modified polytetrafluoroethylene according to any one of the above (1) to (3), wherein the average primary particle size corresponding to D50 as measured by a laser scattering particle size distribution analyzer, is from 0.10 to 0.50 μm.

(5) The modified polytetrafluoroethylene according to any one of the above (1) to (4), wherein the standard specific gravity as obtained in accordance with ASTM D4895-04 is from 2.160 to 2.200.

(6) The modified polytetrafluoroethylene according to any one of the above (1) to (5), wherein the thermal instability index as obtained in accordance with ASTM D4895-04 is from 0 to 15.

(7) The modified polytetrafluoroethylene according to any one of the above (1) to (5), which is for paste extrusion.

(8) A formed product formed by subjecting the modified polytetrafluoroethylene as defined in any one of the above (1) to (6) to paste extrusion.

(9) An electric wire covering material, which comprises the modified polytetrafluoroethylene as defined in any one of the above (1) to (6).

(10) An electric wire, which comprises a core wire and a covering layer comprising the electric wire covering material as defined in the above (9), covering the core wire.

(11) A method for producing the modified polytetrafluoroethylene as defined in any one of the above (1) to (7), which comprises a step of polymerizing tetrafluoroethylene, the monomer represented by the formula (1) and the monomer represented by the formula (2) to produce a modified polytetrafluoroethylene,
wherein the amount of the monomer represented by the formula (1) used is from 0.020 to 0.040 mass % to the total mass of all monomers, and
the amount of the monomer represented by the formula (2) used is from 0.003 to 0.080 mass % to the total mass of all monomers.

(12) The method for producing the modified polytetrafluoroethylene according to the above (11), wherein the amount of the monomer represented by the formula (1) used is from 0.020 to 0.027 mass % to the total mass of all monomers, and the amount of the monomer represented by the formula (2) used is from 0.004 to 0.007 mass % to the total mass of all monomers.

(13) The method for producing the modified polytetrafluoroethylene according to the above (11) or (12), wherein the polymerization is emulsion polymerization.

(14) The method for producing the modified polytetrafluoroethylene according to any one of the above (11) to (13), wherein the step comprises:

a step (c) of polymerizing tetrafluoroethylene, the monomer represented by the formula (1) and the monomer presented by the formula (2) while charging tetrafluoroethylene to the reaction system in the absence of a chain transfer agent, and a step (s) of, after charging at least 80 mass % of the entire amount of tetrafluoroethylene to be used for polymerization for the modified polytetrafluoroethylene to the reaction system, adding a chain transfer agent to the reaction system and further conducting polymerization in the presence of the chain transfer agent.

(15) The method for producing the modified polytetrafluoroethylene according to the above (14), wherein in the step (c), at the time of start of the polymerization, the entire amounts of the monomer represented by the formula (1) and the monomer represented by the formula (2) are present in the reaction system.

Advantageous Effects of Invention

According to the present invention, it is possible to provide a modified PTFE which can be formed under a low extrusion pressure and with which changes of the extrusion pressure are suppressed even in paste extrusion at a high RR ratio.

Further, according to the present invention, it is possible to provide a method for producing the modified PTFE, a formed product, an electric wire covering material, and an electric wire.

DESCRIPTION OF EMBODIMENTS

Meanings of terms in the present invention are as follows.

A "unit based on a monomer" generally means an atomic group directly formed by polymerization of one molecule of a monomer, and an atomic group obtained by chemically converting a part of the atomic group. A unit based on a monomer will sometimes be referred to simply as a unit. The content (mass %) of each type of units to all units contained in a polymer is obtained by analyzing the polymer by solid state nuclear magnetic resonance (NMR), or may be estimated from the amounts of the monomers charged. Usually, the content of each type of units calculated from the amount of each monomer charged substantially agrees with the actual content of each unit.

"to" used to show the range of the numerical values is used to include the numerical values before and after it as the lower limit value and the upper limit value.

<Modified PTFE>

The modified PTFE (modified PTFE copolymer) of the present invention is characterized in that the units based on a monomer represented by the after-described formula (1) and the units based on a monomer represented by the after-described formula (2) are contained in predetermined amounts. Particles constituted by the modified PTFE containing the units based on the monomers (units derived from the monomers) tend to have uniform particle size of primary particles, have a sharp particle size distribution and have a reduced proportion of deformed particles in the primary particles. As a result, the particles can be formed under a low extrusion pressure, and changes of the extrusion pressure are suppressed, even in paste extrusion at a high RR ratio. A high RR ratio means an RR ratio of at least 1,000.

The modified PTFE of the present invention has units based on TFE, units based on a monomer represented by the formula (1) and units based on a monomer represented by the formula (2).

(Unit T)

The modified PTFE has units based on TFE (hereinafter sometimes referred to as units T). The modified PTFE usually contains the units T as the main component. TFE is used as the main component. The main component means a content of the units T to all units in the modified PTFE of at least 99.600 mass %, and preferably at least 99.700 mass %, more preferably at least 99.800 mass %. The upper limit is not particularly limited and is at most 99.990 mass % in many cases.

(Monomer Represented by Formula (1))

The modified PTFE has units (hereinafter sometimes referred to as units 1) based on a monomer represented by the following formula (1) (hereinafter sometimes referred to as monomer 1):

$$CH_2=CH-C_nF_{2n+1} \qquad (1)$$

In the formula (1), n is an integer of from 2 to 6. In view of handling efficiency, n is preferably an integer of from 4 to 6, more preferably 4.

The content of the units 1 is from 0.020 to 0.040 mass % to all units in the modified PTFE. If the content of the units 1 is less than 0.020 mass %, changes of the extrusion pressure tend to be significant, and if the content of the units 1 is higher than 0.040 mass %, the extrusion pressure tends to be high, and changes of the extrusion pressure tend to be significant.

Particularly, the content of the units 1 is, in order to satisfy both low extrusion pressure and suppression of changes of the extrusion pressure at the time of paste extrusion at a high RR ratio, preferably from 0.020 to 0.030 mass %, more preferably from 0.020 to 0.027 mass %, further preferably from 0.022 to 0.026 mass %.

The monomer 1 may be used alone or in combination of two or more. In a case where two or more types of the monomer 1 are used, the total content of the units based on the respective monomers 1 should be within the above range.

(Monomer Represented by Formula (2))

The modified PTFE has units (hereinafter sometimes referred to as units 2) based on a monomer represented by the following formula (2) (hereinafter sometimes referred to as monomer 2).

$$CF_2=CFO(LO)_mRf \qquad (2)$$

In the formula (2), L is a perfluoroalkylene group. The perfluoroalkylene group is a group having all hydrogen atoms in an alkylene group substituted by fluorine atoms.

The perfluoroalkylene group is preferably a perfluoropropylene group.

The perfluoroalkylene group may be linear or branched. Further, in a case where a plurality of (LO) are contained, L may be the same or different.

Rf is a perfluoroalkyl group. The perfluoroalkyl group means a group having all hydrogen atoms in an alkyl group substituted by fluorine atoms.

The number of carbon atoms in the perfluoroalkyl group is, in view of handling efficiency, preferably from 1 to 4, more preferably from 1 to 3. The perfluoroalkyl group may be linear or branched.

m is an integer of from 0 to 4. In view of availability, m is preferably an integer of from 0 to 2, more preferably an integer of from 0 to 1.

The content of the units 2 is from 0.003 to 0.080 mass % to all units in the modified PTFE. The content of the units 2 is less than 0.003 mass %, changes of the extrusion pressure tend to be significant, and if the content of the units 2 is higher than 0.080 mass %, the extrusion pressure tends to be high.

Particularly, the content of the units 2 is, to satisfy both low extrusion pressure and suppression of changes of the extrusion pressure at the time of paste extrusion at a high RR ratio, preferably from 0.004 to 0.008 mass %, more preferably from 0.004 to 0.007 mass %, further preferably from 0.004 to 0.006 mass %.

The monomer 2 may be used alone or in combination of two or more. In a case where two or more types of the monomer 2 are used, the total content of the units based on the respective monomers 2 should be within the above range.

Particularly, in order that in paste extrusion at a high RR ratio, forming is possible under a lower extrusion pressure, and/or changes of the extrusion pressure are more suppressed (hereinafter referred to as more excellent effects of the present invention), it is preferred that the content of the units 1 is from 0.020 to 0.027 mass % to all units in the modified PTFE, and the content of the units 2 is from 0.004 to 0.007 mass % to all units in the modified PTFE.

The modified PTFE may contain units other than the units T, units 1 and units 2, however, in view of more excellent effects of the present invention, the total content of the units T, the units 1 and the units 2 is preferably at least 99.990 mass % to all units in the modified PTFE, and it is more preferred that the modified PTFE consists solely of the units T, the units 1 and the units 2.

The standard specific gravity (hereinafter sometimes referred to as SSG) of the modified PTFE is not particularly limited, and is preferably from 2.160 to 2.200, more preferably from 2.170 to 2.200, further preferably from 2.170 to 2.190. SSG is the index of the molecular weight, and higher SSG means a lower molecular weight.

When SSG is within the above range, the extrusion pressure at the time of paste extrusion more decreases, and further, for example, when the modified PTFE is used as a material of a covering layer of an electric wire, adhesion between the core wire and the covering layer will more improve.

SSG may be adjusted by controlling polymerization conditions (such as polymerization pressure) at the time of producing the modified PTFE. Further, according to the after-described method comprising the step (c) and the step (s), details of which will be described hereinafter, SSG of the obtainable modified PTFE can easily be kept to be at most the upper limit value.

The thermal instability index (hereinafter sometimes referred to as TII) of the modified PTFE is not particularly limited and is preferably from 0 to 15, more preferably from 0 to 10, further preferably from 0 to 6. TII is an index of the heat resistance, and lower TII means more excellent heat resistance. When TII is within the above range, for example, the modified PTFE can suitably be used also for applications for which high heat resistance is required, such as covering on an electric wire to be used for a vehicle such as an automobile.

Properties of the modified PTFE are not particularly limited, and in view of handling efficiency, etc., the modified PTFE is preferably in the form of particles (in the form of modified PTFE particles).

The average primary particle size of the modified PTFE particles is not particularly limited, and is preferably from 0.10 to 0.50 µm, more preferably from 0.10 to 0.30 µm, further preferably from 0.15 to 0.25 µm. When the average primary particle size is at least 0.10 µm, paste extrusion is possible under a low extrusion pressure, and a formed product excellent in surface smoothness, without wavings or the like on the surface, tends to be obtained. When the average primary particle size is at most 0.50 µm, spaces between particles at the time of extrusion tend to be small, whereby the modified PTFE particles are excellent in extrusion stability and thus a formed product excellent in surface smoothness is likely to be obtained.

The average primary particle size of the modified PTFE particles corresponds, for example, D50 as measured by a laser scattering particle size distribution analyzer. As described hereinafter, when the modified PTFE is produced by emulsion polymerization, the average primary particle size of the modified PTFE can be obtained by the above measurement using an aqueous emulsion of the modified PTFE as the sample.

The paste extrusion pressure of the modified PTFE is not particularly limited, and the paste extrusion pressure by the following measurement method is preferably from 20 to 35 MPa, more preferably from 25 to 35 MPa, further preferably from 27 to 31 MPa. When the paste extrusion pressure is within the above range, surface roughening and occurrence of white cracks on the formed product obtained by paste extrusion will be more suppressed.

[Method for Measuring Paste Extrusion Pressure]

(1) 226.8 g of the sample and 43.2 g of a lubricant consisting of 100% isoparaffin hydrocarbon, having an initial boiling point of 180° C., a dry point of 188° C., a flash point of 54° C., a density (15° C.) of 0.758 g/cm$^3$, KB (kauri-butanol value) of 26, an aniline point of 85° C. and an aromatic content <0.01 mass %, are mixed in a glass bottle and aged at 25° C. for 8 hours. The values are values obtained in accordance with the following standards.

Initial boiling point: JIS K2254
Dry point: JIS K2254
Flash point: ASTM D-56
Density: JIS K2249
KB value: ASTM D1133-61
Aniline point: JIS K2256
Aromatic content: JIS K2536

(2) A cylinder (a) having an inner diameter of 39.4 mm is filled with the mixture aged in the above (1), and a load of 55 kgf (539 N) is applied to a piston inserted into the cylinder (a) and held for 2 minutes.

(3) The mixture is taken out from the cylinder (a) and put in an extrusion die (die angle: 20°, diameter of orifice: 1.274 mm) provided with a cylinder (b) (inner diameter: 40.3 mm), and extruded at a ram speed of 20 mm/min at a die temperature of 40° C. to obtain a string-like product (beads). The reduction ratio (RR ratio) is 1,000.

The mixture is taken out from the cylinder (a), for example, by a method of drawing the mixture from the upper part of the cylinder (a) by using a jig equipped with a screw rod (made of stainless steel) such as one which a corkscrew has.

(4) A value obtained by dividing the extrusion force when the extrusion pressure is in an equilibrium state, at a later stage of extrusion, by the cross sectional area on the basis of the inner size of the cylinder (b), is taken as the paste extrusion pressure (MPa).

The lubricant used in the above (1) may be "ISOPAR H" (manufactured by Exxon, tradename, cas number: 64742-48-9).

<Method for Producing Modified PTFE>

The method for producing the modified PTFE is not particularly limited, and a known method may be employed.

Usually, the method for producing the modified PTFE comprises a step of polymerizing TFE, the monomer 1 and the monomer 2 to produce the modified PTFE (hereinafter sometimes referred to as step X). In the step X, the amount of the monomer 1 used is from 0.020 to 0.040 mass % to the total mass of all monomers (the total mass of all the monomers used), and the amount of the monomer 2 used is from 0.003 to 0.080 mass % to the total mass of all monomers.

In view of more excellent effects of the present invention, it is preferred that the amount of the monomer 1 used is from 0.020 to 0.030 mass % to the total mass of all monomers, and the amount of the monomer 2 used is from 0.004 to 0.008 mass % to the total mass of all monomers.

Particularly, in view of more excellent effects of the present invention, it is preferred that the amount of the monomer 1 used is from 0.020 to 0.027 mass % to the total mass of all monomers, and the amount of the monomer 2 used is from 0.004 to 0.007 mass % to the total mass of all monomers.

In the above step, usually, TFE is used as the main component. The main component means that the amount of TFE used is, to the total mass of all monomers, at least 99.600 mass %, and preferably at least 99.700 mass %, more preferably at least 99.800 mass %. The upper limit is not particularly limited, and is at most 99.990 mass % in many cases.

Further, a monomer other than TFE, the monomer 1 and the monomer 2 may be used, however, in view of more excellent effects of the present invention, the total content of TFE, the monomer 1 and the monomer 2 is preferably at least 99.990 mass % to the total mass of all monomers, and it is more preferred that only TFE, the monomer 1 and the monomer 2 are used.

In view of handling efficiency of the modified PTFE, the polymerization is preferably emulsion polymerization. That is, as a polymerization method for the modified PTFE, emulsion polymerization method is preferred. In the emulsion polymerization method, it is preferred to use, at the time of the polymerization reaction of TFE, the monomer 1 and the monomer 2, an aqueous medium, an emulsifying agent, a stabilizing aid, a polymerization initiator, etc.

As the aqueous medium, usually, water is used.

The emulsifying agent is preferably a fluorinated anionic surfactant having a LogPOW of from 2.4 to 3.4. The LogPOW is a distribution coefficient in 1-octanol and water as stipulated in OECD Test Guideline 107, 117 and Japanese Industrial Standard Z7260-107 (2000).

POW represents, at the time when a mixed liquid of octanol/water (1:1) each containing a surfactant to be measured, is phase-separated, a ratio of "the surfactant concentration in octanol/the surfactant concentration in water". A surfactant having a large distribution coefficient value has a high bioaccumulation property, and a surfactant having a small distribution coefficient value has a low bioaccumulation property. When the LogPOW is less than 3.5, the bioaccumulation property is judged to be low.

Further, when the LogPOW is at least 2.4, the stability of the aqueous emulsion of the modified PTFE can be maintained well during polymerization. The LogPOW is preferably from 2.4 to 3.3, more preferably from 2.5 to 3.3, further preferably from 2.5 to 3.2.

As a fluorinated anionic surfactant having a LogPOW of from 2.4 to 3.4, preferred is a fluorinated anionic surfactant having 6 or 7 carbon atoms, 0 or 1 hydrogen atom, 0 or from 1 to 4 etheric oxygen atoms, a group represented by —COOA (A is H, $NH_4$ or an alkali metal atom) and the rest of atoms being fluorine atoms.

As specific examples of the fluorinated anionic surfactant having a LogPOW of from 2.4 to 3.4, one or more members selected from the group consisting of
$CF_3OCF(CF_3)CF_2OCF(CF_3)COOA$,
$CF_3CF_2OCF_2CF_2OCF_2COOA$,
$CF_3OCF_2CF_2CF_2OCHFCF_2COOA$,
$C_3F_7OCF(CF_3)COOA$,
$H(CF_2CF_2)_3COOA$,
$CF_3CF_2(CF_2CF_2)_2COOA$,
$CF_3(CF_2CF_2)_2COOA$,
and a compound represented by the following formula (3) are preferred. In the formulae, A is H, $NH_4$ or an alkali metal atom (preferably Na or K).

Formula (3)

Among these fluorinated anionic surfactants, from the viewpoint of excellent stability of the aqueous emulsion of the modified PTFE during polymerization, and a low bioaccumulation property, $CF_3CF_2OCF_2CF_2OCF_2COOA$, $CF_3OCF_2CF_2CF_2OCHFCF_2COOA$ or a compound represented by the formula (3) is preferred, $CF_3CF_2OCF_2CF_2OCF_2COOA$ is more preferred. Particularly, the fluorinated anionic surfactant wherein A is $NH_4$ is further preferred.

The amount of the fluorinated anionic surfactant to be present (used) is, based on the final production product, i.e. the modified PTFE, preferably from 0.2 to 2 mass %, more preferably from 0.4 to 2 mass %, further preferably from 0.5 to 2 mass %.

When the amount of the fluorinated anionic surfactant to be present, is at most 2 mass %, the modified PTFE particles are less likely to become a rod-shape, and it will be easy to obtain good stability of the aqueous emulsion. When the amount is at least 0.2 mass %, it will be easy to obtain good stability of an aqueous emulsion during polymerization, and it will be easy to prevent agglomeration of the modified PTFE particles or formation of coagulum.

For the emulsion polymerization, it is preferred to use a stabilizing aid. The stabilizing aid is preferably one which has sufficient hydrophobicity and which is readily separable and removable from the aqueous emulsion of the modified PTFE after the emulsion polymerization.

As the stabilizing aid, paraffin wax, fluorinated oil, fluorinated solvent, silicone oil or the like is preferred, and paraffin wax is more preferred. The stabilizing aid may be used alone or in combination of two or more.

Paraffin wax may be liquid, semi-solid or solid at room temperature, but is preferably a saturated hydrocarbon having at least 16 carbon atoms. The melting point of paraffin wax is preferably from 40 to 65° C., more preferably from 50 to 65° C.

The amount of the stabilizing aid to be used, is preferably from 0.1 to 12 mass %, more preferably from 0.1 to 8 mass %, relative to the aqueous medium to be used. When the amount is at least the lower limit value in the above range, it is easy to obtain good stability of the aqueous emulsion of the modified PTFE during polymerization. If the stability of the aqueous emulsion of the modified PTFE during polymerization is impaired, coagula are likely to be formed in a large amount. When the amount is at most the upper limit value, it will be easy to separate and remove the stabilizing aid after polymerization.

The polymerization initiator is preferably a water-soluble radical initiator or a water-soluble redox catalyst.

The water-soluble radical initiator is preferably a persulfate such as ammonium persulfate or potassium persulfate, or a water-soluble organic peroxide such as disuccinic acid peroxide, bisglutaric acid peroxide or tert-butyl hydroperoxide.

The water-soluble redox catalyst is preferably a combination of an oxidizing agent such as bromic acid or its salt, chloric acid or its salt, persulfuric acid or its salt, permanganic acid or its salt, or hydrogen peroxide, and a reducing agent such as sulfurous acid or its salt, bisulfite or its salt, thiosulfuric acid or its salt, or an organic acid. Among them, more preferred is a combination of bromic acid or its salt, and sulfurous acid or its salt or ammonium sulfite, or a combination of permanganic acid or its salt, potassium permanganate and oxalic acid.

The polymerization initiator is preferably a mixed system of a persulfate and disuccinic acid peroxide, more preferably a mixed system of ammonium persulfate and disuccinic acid peroxide. The polymerization initiator may be used alone or in combination of two or more.

The amount of the polymerization initiator used is, based on the entire amount of TFE used for polymerization being 100 mass %, preferably from 0.01 to 0.20 mass %, more preferably from 0.01 to 0.15 mass %.

Among them, in view of more excellent effects of the present invention, the method for producing the modified PTFE is preferably a method comprising a step (c) of polymerizing TFE, the monomer 1 and the monomer 2 while charging TFE to the reaction system in the absence of a chain transfer agent, and a step (s) of, after charging at least 80 mass % of the entire amount of TFE to be used for polymerization for the modified PTFE to the reaction system, adding a chain transfer agent to the reaction system and further conducting polymerization in the presence of the chain transfer agent. That is, the step X preferably comprises the step (c) and the step (s).

By conducting the above step (c) and step (s), it is possible to obtain modified PTFE particles having a core part containing the T units, the units 1 and the units 2, and a shell part mainly composed of the T units. That is, so-called core-shell structure particles can be obtained. Particularly, by using a chain transfer agent at the time of producing the shell part, the molecular weight of the modified PTFE contained in the obtainable shell part can be decreased and as a result, paste extrusion is more easily conducted.

The step (c) and the step (s) are carried out preferably by emulsion polymerization as described above.

Usually, the step (c) and the step (s) are continuously carried out in the same polymerization reactor. Further, in the step (c) and the step (s), TFE is continuously or intermittently charged to the reaction system. That is, TFE is continuously or intermittently charged to the polymerization reactor.

Further, "after charging at least 80 mass % of the entire amount of TFE to be used for polymerization for the modified PTFE to the reaction system" means that after at least 80 mass % of the entire amount of TFE to be used for polymerization for the modified PTFE is charged to the polymerization reactor.

(Step (c))

In the step (c), TFE, the monomer 1 and the monomer 2 are polymerized while TFE is charged to the reaction system in the absence of a chain transfer agent. The amounts of the monomer 1 and the monomer 2 used (charged) in the step (c) are as described above.

In the step (c), no chain transfer agent is used. If polymerization is carried out by using a chain transfer agent, generally, the molecular weight of the obtainable polymer tends to be small. In the step (c), by conducting copolymerization in the absence of a chain transfer agent, a decrease of the molecular weight at the core portion can be suppressed. As a result, SSG of the modified PTFE can be controlled to be within the above preferred range. When such a modified PTFE is used to form a covering on a core wire (for example, an electric wire), the adhesion between the core wire and the covering layer will be excellent.

As a method of charging the monomer 1 and the monomer 2, preferred is initial batch addition of charging the entire amounts thereof to the reaction system before initiation of the polymerization reaction. That is, it is preferred that in the step (c), at the time of initiation of the polymerization, the entire amounts of the monomer 1 and the monomer 2 are present in the reaction system.

By the initial batch addition of the monomer 1 and the monomer 2, in the step (c), the entire amounts of the monomer 1 and the monomer 2 are likely to be copolymerized with TFE at the initial stage of polymerization, and the core portion is modified by the monomer 1 and the monomer 2. With respect to particles of the modified PTFE obtained by modification of the core portion, the particle size of the primary particles is uniform, formation of deformed particles is suppressed, and excellent paste extrusion property will be achieved.

TFE is charged to the reaction system (that is, the polymerization reactor) by a conventional method. Specifically, it is charged continuously or intermittently so that the polymerization pressure will be a specific pressure.

(Step (s))

The step (s) is a step of, after charging at least 80 mass % of the entire amount of TFE to be used for polymerization for the modified PTFE to the reaction system, adding a chain transfer agent to the reaction system and further conducting polymerization in the presence of the chain transfer agent. Usually, at the stage of the step (c), substantially the entire amounts of the monomer 1 and the monomer 2 are polymerized, in the step (s), mainly only TFE is polymerized to form a shell part mainly composed of the units T.

By conducting polymerization in the presence of a chain transfer agent, it is possible to form a shell part having a lower molecular weight than the core part outside the core part formed in the step (c), whereby modified PTFE more excellent in paste extrusion forming property can be produced.

In the step (s), after charging at least 80 mass % of the entire amount of TFE to be used for polymerization to the reaction system (in other words, the polymerization reactor), a chain transfer agent is added to the reaction system.

Particularly, it is preferred to start addition of the chain transfer agent when 80 to 95 mass % of the entire amount of TFE to be used for polymerization is charged to the reaction system, it is more preferred to start addition of the chain transfer agent when 85 to 95 mass % of the entire amount of TFE to be used for polymerization is charged to the reaction system, it is further preferred to start addition of the chain transfer agent when 85 to 92 mass % of the entire amount of TFE to be used for polymerization is charged to the reaction system, and it is particularly preferred to start addition of the chain transfer agent when 88 to 92 mass % of the entire amount of TFE to be used for polymerization is charged to the reaction system.

Further, for example, "when 80 to 95 mass % of the entire amount of TFE to be used for polymerization is charged to the reaction system" specifically means "after a point when 80% of the entire amount of TFE to be used for polymerization is charged to the reaction system, to a point before 95 mass % of the entire amount of TFE to be used for polymerization is charged to the reaction system".

The chain transfer agent may be added by any of batch addition, continuous addition and intermittent addition. In a case where the chain transfer agent is added continuously or intermittently, it is necessary that at least the first addition is carried out at a point when TFE in a proportion within the above range is charged to the reaction system, and addition of the entire amount of the chain transfer agent is completed before the entire amount of TFE is polymerized. Preferred is continuous addition, in that the molecular weight can be more decreased as the polymerization proceeds, and the modified PTFE excellent in paste extrusion forming property can be produced.

The chain transfer agent may, for example, a water-soluble organic compound such as methanol, an alkane such as methane, ethane or propane, hydrogen, or a halogenated hydrocarbon, and is preferably methanol.

The amount of the chain transfer agent added is, based on the entire amount of TFE used for polymerization being 100 mass %, preferably from 0.002 to 0.3 mass %, more preferably from 0.005 to 0.3 mass %, further preferably from 0.006 to 0.25 mass %.

The polymerization conditions in the step (c) and the step (s) are not particularly limited, and optimum conditions are selected in accordance with monomers used, and usually, the polymerization temperature is preferably from 10 to 95° C., and the polymerization pressure is preferably from 0.3 to 4.0 MPa.

The total polymerization time including the step (c) and the step (s) is preferably from 100 to 520 minutes.

In a case where production of the modified PTFE is carried out by emulsion polymerization, the concentration of the modified PTFE particles in the emulsified dispersion obtained by emulsion polymerization is preferably from 10 to 45 mass %, more preferably from 15 to 45 mass %, further preferably from 20 to 43 mass %. Within the above range, modified PTFE particles in the emulsified dispersion can more easily be coagulated, and cloudiness of the coagulated liquid can be suppressed.

As a method to obtain a modified PTFE powder (modified PTFE fine powder) comprising the modified PTFE particles from the emulsified dispersion obtained by emulsion polymerization, a known method may be employed.

For example, the emulsified dispersion containing the modified PTFE particles is diluted with water so that the concentration of the modified PTFE in the dispersion is from 8 to 25 mass %, and the temperature of the emulsified dispersion is adjusted to from 5 to 35° C., and the emulsified dispersion is vigorously stirred for coagulation. On that occasion, a pH may be adjusted as the case requires. Further, a coagulation aid such as an electrolyte or a water-soluble organic solvent may be added to the emulsified dispersion.

Then, the coagulated modified PTFE particles are separated from water by moderate stirring, and the obtained wet powder (wet fine powder) is granulated and classified as the case requires, followed by drying, whereby a modified PTFE powder is obtained.

The drying may be carried out in a state where the wet powder is not so much moved, preferably in a state where it is left at rest. The drying method may be vacuum drying, high frequency drying or hot air drying.

A modified PTFE powder usually has a property such that it is easily fibrillated even with a small shearing force, and loses the original crystal structure. Particularly contact and friction among the modified PTFE particles particularly at high temperature tend to make fibrillation proceed. Progress of fibrillation is not preferred with a view to preventing an increase of the extrusion pressure at the time of paste extrusion. Accordingly, the drying temperature is preferably from 10 to 250° C., more preferably from 100 to 200° C.

<Formed Product>

The modified PTFE of the present invention is suitably used for paste extrusion.

The formed product of the present invention is obtained by subjecting the modified PTFE (particularly modified PTFE powder) to paste extrusion.

Paste extrusion is a method of mixing a modified PTFE powder and a lubricant to impart fluidity to the modified PTFE powder, followed by extrusion to form a formed product such as a film or a tube.

The mixing ratio of the lubricant is properly determined so that the modified PTFE powder has fluidity and for example, based on the total amount of the modified PTFE powder and the lubricant being 100 mass %, preferably from 10 to 30 mass %, more preferably from 15 to 20 mass %.

The lubricant is preferably naphtha or a petroleum-based hydrocarbon having a dry point of at least 100° C.

To the mixture, additives such as a pigment may be added for coloring, or a filler may be added for the purpose of imparting the strength, conductivity, etc.

The shape of the formed product may be various including tubular, sheet, film, fibrous, etc. As its applications, tubes, wire coatings, sealing materials, porous membranes, filters, etc. may be mentioned. Particularly, the modified PTFE is suitably used as an electric wire coating material.

The electric wire of the present invention is produced by a method of forming a covering on the outer periphery of a core wire by paste extrusion using the modified PTFE of the present invention. That is, the electric wire of the present invention comprises a core wire and a covering layer comprising an electric wire covering material constituted by the modified PTFE, covering the core wire.

EXAMPLES

Now, the present invention will be described in further detail with reference to Examples and Comparative Examples. However, it should be understood that the present invention is by no means restricted thereto.

The measuring methods and evaluation methods are as follows.

(A) The Average Primary Particle Size (nm) of the Modified PTFE (Hereinafter Sometimes Referred to as PPS)

Using an emulsified dispersion of the modified PTFE, the average primary particle size was measured by a laser scattering particle size distribution analyzer (manufactured by HORIBA, Ltd. tradename "LA-920").

(B) Standard Specific Gravity (SSG)

It was measured in accordance with ASTM D4895-04.

12.0 g of a sample (fine powder) was weighed and held under 34.5 MPa for 2 minutes in a cylindrical mold having an inner diameter of 28.6 mm, and put in an oven of 290° C. and heated at 120° C./hr, and further held at 380° C. for 30 minutes, then cooled at 60° C./hr and held at 294° C. for 24 minutes. After holding it for 12 hours in a desiccator of 23° C., the specific gravity value of the sample to water at 23° C. was measured and taken as the standard specific gravity. A lower SSG value means a higher molecular weight.

(C) Thermal Instability Index (TII)

It was measured in accordance with ASTM D4895-04. A sample for extended specific gravity (hereinafter sometimes referred to as ESG) was prepared in the same manner as for the above SSG except that the retention time at 380° C. was changed from 30 minutes to 360 minutes.

TII was calculated in accordance with TII=(ESG−SSG)×1,000.

A lower TII value means little change of the molecular weight when the retention time at 380° C. is long, that is, excellent heat resistance.

TII was evaluated in accordance with the following standard.

"A": at least 0 and at most 6
"B": more than 6

(D) Paste Extrusion Pressure (MPa)

(1) 226.8 g of the sample and 43.2 g of a lubricant consisting of 100% isoparaffin hydrocarbon, having an initial boiling point of 180° C., a dry point of 188° C., a flash point of 54° C., a density (15° C.) of 0.758 g/cm$^3$, KB of 26, an aniline point of 85° C. and an aromatic content <0.01 mass %, were mixed in a glass bottle and aged at 25° C. for 8 hours.

(2) A cylinder (a) having an inner diameter of 39.4 mm was filled with the mixture aged in the above (1), and a load of 55 kgf (539 N) was applied to a piston inserted into the cylinder (a) and held for 2 minutes.

(3) The mixture was taken out from the cylinder (a) and put in an extrusion die (die angle: 20°, diameter of orifice: 1.274 mm) provided with a cylinder (b) (inner diameter: 40.3 mm), and extruded at a ram speed of 20 mm/min at a die temperature of 40° C. to obtain a string-like product (beads). The reduction ratio (RR ratio) was 1,000.

The mixture was taken out from the cylinder (a), for example, by a method of drawing the mixture from the upper part of the cylinder (a) by using a jig equipped with a screw rod (made of stainless steel) such as one which a corkscrew has.

(4) A value obtained by dividing the extrusion force when the extrusion pressure was in an equilibrium state, at a later stage of extrusion, by the cross sectional area on the basis of the inner size of the cylinder (b), was taken as the paste extrusion pressure (MPa).

(E) Extrusion Pressure Change Range, White Crack Appearance Frequency, Transparency (1) Preparation of Evaluation Sample To the sample (fine powder) (700 g), "ISOPAR H" (manufactured by Exxon, tradename) as a lubricant was added in a proportion of 18 mass % (the total amount of the sample and the lubricant was 100 mass %) and rotated at 100 rpm for 30 minutes to obtain a mixture. The mixture was aged at room temperature for 8 hours. The mixture after aging was preliminary formed and extruded to continuously cover a wire (consisting of nineteen 0.202 mm nickel plated strands, AWG 20 having an outer diameter of 1.01 mm) using an extruder at an RR ratio of 1,200. The wire was subjected to an oven for lubricant removal at 250° C. then fired in an oven at 425° C. and quenched to room temperature to obtain an evaluation sample.

(2) Extrusion Pressure Change Range

In the above (1) preparation of evaluation sample, after initiation of covering on the wire, in a region at a point of from 15 m to 25 m at the first stage, and in a region at a point of from 75 m to 85 m at the latter stage, the maximum spike peak width of the pressure change was read, which was divided by the value of the baseline of the immediately preceding pressure and represented by %. The extrusion pressure change range is preferably from 0 to 5% in either region at the first stage and region at the latter stage.

(3) White Crack Appearance Frequency

In the above (1) preparation of evaluation sample, after initiation of covering on the wire, 10 m after the point of 15 m was taken, and the number of white cracks was visually counted, by which 1,000 cm (10 m) was divided to determine the white crack appearance frequency (1,000/number of white cracks) and evaluated based on the following standards. The higher the white crack appearance frequency, the more appearance of the white cracks is suppressed.

A: white crack appearance frequency being at least 50
B: white crack appearance frequency being at least 20 and less than 50
C: white crack appearance frequency being less than 20

(4) Transparency

In the above (1) preparation of evaluation sample, the wire was withdrawn from the sample after covering on the wire, and the covering sheath was cut into 3 cm length and cut into halves in the traveling direction, sandwiched between aluminum plates, a load of about 1 kg was applied thereon and left at 120° C. for 1 hour. Then, the sample was taken out, and its inside was scraped by a cutter into 0.15 mm thickness with measuring by a microgauge, and the transmittance at 550 nm was measured by spectrophotometer UVmini1240 manufactured by Shimadzu Corporation and evaluated in accordance with the following standards.

A: the transmittance being at least 50%
B: the transmittance being at least 40% and less than 50%
C: the transmittance being less than 40%

(F) Electric Wire Drawing Strength:

(1) Preparation of Electric Wire

A sieved sample (fine powder) (700 g) was put in a glass bottle. Into the bottle, 133 to 164 g (corresponding to 16 to 19 mass % based on the total amount of the fine powder and naphtha being 100 mass %) of naphtha was poured so that the extrusion pressure under the after-described extrusion conditions would be 27 MPa, and the bottle was lidded and put on a ball mill, followed by stirring for 30 minutes to obtain a mixture.

Prior to preliminary forming and extrusion, the mixture was aged at 24° C. for 8 hours. The aged mixture was preliminarily formed to form a rod, and the rod was set to a barrel of a ram paste extruder, and the barrel was closed by a master die.

By the ram of the extruder, the rod (paste) was passed through a die (inner diameter: 2.0 mm) at the tip of the extruder and extruded at a ram speed of 3.0 mm/min so as to continuously cover the wire. As the wire, one of AWG 20 having an outer diameter of 1.01 mm, consisting of nineteen nickel-plated strands each having an outer diameter of 0.202 mm was used.

The RR ratio, which is represented by the ratio of the ram portion area S1 to the tip discharge area S2 of the extruder, is an area of a doughnut-shape portion having the area of a circle portion subtracted from the outer circle area regarding both S1 and S2, since the wire (core wire) runs through the center portion of the rod. The diameter of the outer circle of S1 is 60.1 mm, and the diameter of the inner circle (core wire portion) of S1 is 12.0 mm. The diameter of the outer circle of S2 is 2.0 mm, and the diameter of the inner circle (core wire portion) of S2 is 1.01 mm. RR calculated from these values is RR=S1/S2=1,164.

Then, the covered wire was subjected to an oven for naphtha removal having a length of 1.7 m and then subjected to an oven for firing having a length of 1.7 m. The rate (wire rate) at which the wire was subjected to each oven was 2.5 m/min.

The electric wire thus obtained was cooled at room temperature, and three electric wires having a length of 140 mm were cut from a portion of 25 mm and apart from the tip. The thickness of the covering on the electric wire was about 500 μm.

The oven for naphtha removal has temperature zones of 140° C., 160° C. and 210° C., and the oven for firing has temperature zones of 340° C., 360° C. and 420° C.

(2) Measuring Method

With respect to each of the three electric wires having a length of 140 mm cut in the above (1), the covering on a portion from one end to 40 mm was peeled to expose the 40 mm length wire to prepare three measurement samples. Using a tensile tester (an apparatus as specified in ASTM D638), a force to draw the wire from the covering was applied to the measurement sample at a crosshead speed of 50 mm/min to obtain a stress/strain curve. The peak value of the stress in the curve was obtained. Measurement was conducted on each of the three measurement samples, and the average of the peaks obtained from these three samples is taken as the electric wire drawing strength and evaluated based on the following standards.

A: the electric wire drawing strength being at least 20 N
B: the electric wire drawing strength being less than 20 N The electric wire drawing strength was measured specifically as follows.

Figure 1A:
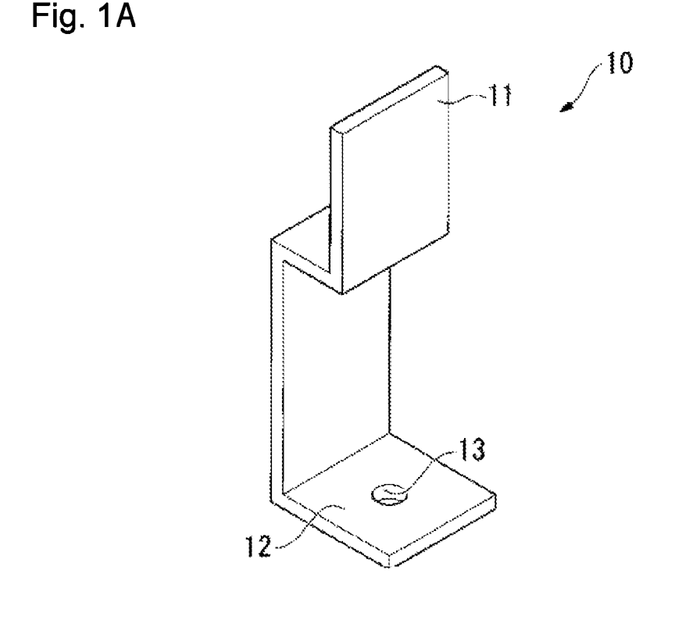
FIGS. 1A and 1B are views schematically illustrating a method for measuring the electric wire drawing strength.

As shown in FIG. 1A, a measurement assistance plate 10 made of a metal having a clamp adapter plate 11 and a measurement sample holding plate 12 was prepared. The measurement sample holding plate 12 was perpendicularly disposed to the clamp adapter plate 11.

On the measurement sample holding plate 12, a penetrating hole 13 was formed having such a size that the wire of the measurement sample could pass through and the portion having the covering formed thereon could not. The inner diameter of the penetrating hole 13 was from 1.05 to 1.1 times the diameter of the wire.

Figure 1B:
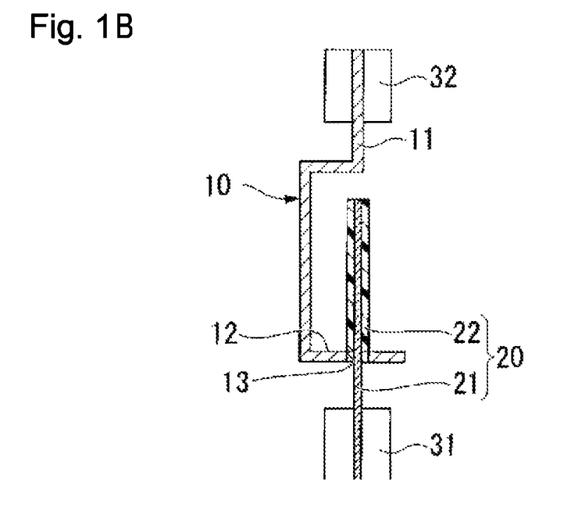

Then, as shown in FIG. 1B, using the measurement assistance plate 10, a measurement sample 20 was set to a tensile tester.

That is, the measurement assistance plate 10 was disposed so that the clamp adapter plate 11 was on the upper side and the measurement sample holding plate 12 was on the lower side, and a wire 21 portion of the measurement sample 20 was passed through the penetrating hole 13 from the upper side to the lower side, whereby the portion having a covering 22 formed of the measurement sample 20 was located above the penetrating hole 13. Then, the wire 21 exposed below the penetrating hole 13 was sandwiched by a lower clamp 31 of the tensile tester, and the clamp adapter plate 11 of the measurement assistance plate 10 was sandwiched by an upper clamp 32, as shown in FIG. 1B. When the wire 21 was sandwiched by the lower clamp 31, attention was paid not to crush the wire 21.

Then, a force to draw the wire from covering was applied to the measurement sample at a pulling mode, at a crosshead speed of 50 mm/min as described above, to obtain a stress/strain curve.

As the measurement assistance plate 20, one which would not be deformed during the measurement and could stably hold the measurement sample was used.

Example 1

Into a 100 L stainless steel autoclave, $C_2F_5OC_2F_4OCF_2COONH_4$ (ammonium perfluoro-3,6-dioxaoctanoate, LogPOW:3.1, hereinafter sometimes referred to as APFDO) (4 g) as a fluorinated anionic surfactant, paraffin wax (565 g) as a stabilizing aid and deionized water (60 L) were charged. The autoclave was purged with nitrogen and brought under a reduced pressure, and perfluorobutyl ethylene (hereinafter sometimes referred to as PFBE) (6.2 g) as the monomer 1 and perfluoropropyl vinyl ether (hereinafter sometimes referred to as PPVE) (1.5 g) as the monomer 2 were charged. The autoclave was pressurized to 0.15 MPa with TFE and heated to 70° C. with stirring.

Then, the autoclave was pressurized to 1.96 MPa with TFE, and disuccinic acid peroxide (5.0 g) and ammonium persulfate (0.21 g) as polymerization initiators were injected. The disuccinic acid peroxide was used in the form of its solution (80 mass % concentration), and 5.0 g as the net amount of the disuccinic acid peroxide was added. A decrease of the internal pressure of 0.02 MPa was confirmed, and then polymerization was allowed to proceed while adding TFE to keep the internal pressure to be 1.96 MPa.

Then, APFDO (176 g) was additionally added to the autoclave to continue the reaction. At the time when 23.1 kg of TFE was added, ammonium persulfate (6.3 g) and methanol (8.4 g) as a chain transfer agent were continuously added to the autoclave over a period of 10 minutes. Then, the polymerization was allowed to proceed while adding TFE to keep the internal pressure to be 0.50 MPa. At the time when the amount of TFE added reached 25.7 kg, the reaction was terminated. The polymerization time was 182 minutes. The timing of addition of methanol was a point when 90 mass % of the entire amount of TFE was charged to the reaction system (polymerization reactor).

The obtained emulsified dispersion of modified PTFE was cooled, and the supernatant paraffin wax was removed. The solid content concentration (concentration of modified PTFE) of the emulsified dispersion was about 29 mass %. The average primary particle size of the modified PTFE in the emulsified dispersion was 230 nm.

The emulsified dispersion was diluted with pure water to a solid content concentration of 12 mass %, and adjusted to be 30° C., followed by stirring, to obtain a wet modified PTFE powder, which was dried.

Of the modified PTFE powder, SSG, PPS, the paste extrusion pressure, the extrusion pressure change range, TII, white crack appearance frequency, transparency and electric wire drawing strength are shown in Table 1.

As shown in Table 1, the modified PTFE powder in Example 1 had physical properties required for covering a heat resistant electric wire in a well balanced manner at a high level.

Example 2

A modified PTFE powder was obtained in the same manner as in Example 1 except that the amount of PPVE charged was 1.0 g. The polymerization time was 176 minutes. The amount of TFE added was 25.7 kg in the same manner as in Example 1. Physical properties in Example 2 are shown in Table 1.

Example 3

A modified PTFE powder was obtained in the same manner as in Example 1 except that the amount of PPVE charged was 0.8 g. The polymerization time was 173 minutes. The amount of TFE added was 25.7 kg in the same manner as in Example 1. Physical properties in Example 3 are shown in Table 1.

Example 4

A modified PTFE powder was obtained in the same manner as in Example 1 except that the amount of PPVE charged was 2.0 g. The polymerization time was 161 minutes. The amount of TFE added was 25.7 kg in the same manner as in Example 1. Physical properties in Example 4 are shown in Table 1.

Example 5

A modified PTFE powder was obtained in the same manner as in Example 1 except that the amount of PFBE charged was 7.8 g, and the amount of PPVE charged was 1.0 g. The polymerization time was 194 minutes. The amount of TFE added was 25.7 kg in the same manner as in Example 1. Physical properties in Example 5 are shown in Table 1.

Example 6

A modified PTFE powder was obtained in the same manner as in Example 1 except that the amount of PFBE charged was 7.8 g, and the amount of PPVE charged was 2.0 g. The polymerization time was 212 minutes. The amount of TFE added was 25.7 kg in the same manner as in Example 1. Physical properties in Example 6 are shown in Table 1.

Comparative Example 1

A modified PTFE powder was obtained in the same manner as in Example 1 except that the amount of PFBE charged was 4.7 g, and the amount of PPVE charged was 2.0 g. The polymerization time was 188 minutes. The amount of TFE added was 25.7 kg in the same manner as in Example 1. Physical properties in Comparative Example 1 are shown in Table 1.

Comparative Example 2

A modified PTFE powder was obtained in the same manner as in Example 1 except that the amount of PFBE charged was 12.4 g, and the amount of PPVE charged was 1.0 g. The polymerization time was 192 minutes. The amount of TFE added was 25.7 kg in the same manner as in Example 1. Physical properties in Comparative Example 2 are shown in Table 1.

Comparative Example 3

A modified PTFE powder was obtained in the same manner as in Example 1 except that the amount of PPVE charged was 0.5 g. The polymerization time was 165 minutes. The amount of TFE added was 25.7 kg in the same manner as in Example 1. Physical properties in Comparative Example 3 are shown in Table 1.

Comparative Example 4

Into a 100 L stainless steel autoclave, APFDO (15 g) as a fluorinated anionic surfactant, paraffin wax (586 g) as a stabilizing aid and deionized water (59 L) were charged. The autoclave was purged with nitrogen and brought under a reduced pressure, and PFBE (21.4 g) as the monomer 1 and PPVE (42.4 g) as the monomer 2 were charged. The autoclave was pressurized to 0.15 MPa with TFE and heated to 71° C. with stirring.

Then, the autoclave was pressurized to 1.96 MPa with TFE, and disuccinic acid peroxide (4.1 g) and ammonium persulfate (0.3 g) as polymerization initiators were injected. The disuccinic acid peroxide was used in the form of its solution (80 mass % concentration), and 4.1 g as the net amount of the disuccinic acid peroxide was added. A decrease of the internal pressure of 0.02 MPa was confirmed, and then polymerization was allowed to proceed while adding TFE to keep the internal pressure to be 1.96 MPa. Then, APFDO (164 g) was additionally added to the autoclave to continue the reaction. At the time when the amount of TFE added reached 26.7 kg, the reaction was terminated. The polymerization time was 238 minutes.

Then, in the same manner as in Example 1, a modified PTFE powder was obtained. Physical properties in Comparative Example 4 are shown in Table 1.

In Table 1, "-" means that no evaluation was conducted. Further, in Table 1, each of the PFBE content (mass %) and the PPVE content (mass %) is a content (mass %) to all units in the modified PTFE.

TABLE 1

| | Modified PTFE | | | | Paste extrusion pressure (MPa) | Evaluation | | | | |
|---|---|---|---|---|---|---|---|---|---|---|
| | PFBE content (mass %) | PPVE content (mass %) | SSG | PPS (nm) | | Extrusion pressure change range (first stage/latter stage %) | TII | White crack appearance frequency | Transparency | Electric wire drawing strength |
| Example 1 | 0.024 | 0.006 | 2.178 | 227 | 29.2 | 1.6/1.7 | A | A | A | A |
| Example 2 | 0.024 | 0.004 | 2.178 | 233 | 30.3 | 1.1/0.0 | A | A | A | A |
| Example 3 | 0.024 | 0.003 | 2.174 | 241 | 29.5 | 0.7/0.9 | A | B | B | A |
| Example 4 | 0.024 | 0.008 | 2.176 | 230 | 31.5 | 1.8/2.4 | A | A | A | A |
| Example 5 | 0.030 | 0.004 | 2.176 | 215 | 33.6 | 3.9/3.4 | B | A | A | A |
| Example 6 | 0.030 | 0.008 | 2.178 | 208 | 31.5 | 4.0/3.0 | B | A | A | A |
| Comparative Example 1 | 0.018 | 0.008 | 2.188 | 232 | 28.6 | 3.9/10.0 | B | C | A | B |
| Comparative Example 2 | 0.048 | 0.004 | 2.164 | 201 | 36 | 3.3/5.9 | A | A | A | A |
| Comparative Example 3 | 0.024 | 0.002 | 2.171 | 227 | 29.7 | 6.5/0.2 | A | B | B | A |
| Comparative Example 4 | 0.080 | 0.1586 | 2.149 | 148 | 108 | — | B | — | — | — |

As shown in Table 1, the modified PTFE powders in Examples 1 to 6 had physical properties required for covering a heat resistant electric wire in a well balanced manner at a high level.

Particularly, the modified PTFE powders in Examples 1 and 2 in which the content of the units 1 is from 0.020 to 0.027 mass % to all units in the modified PTFE and the content of the units 2 is from 0.004 to 0.007 mass % to all units in the modified PTFE, were more excellent in the balance in view of the extrusion pressure, the extrusion pressure change range, TII, the white crack appearance frequency, the transparency and the electric wire drawing strength.

This application is a continuation of PCT Application No. PCT/JP2018/020575, filed on May 29, 2018, which is based upon and claims the benefit of priority from Japanese Patent Application No. 2017-110318 filed on Jun. 2, 2017. The contents of those applications are incorporated herein by reference in their entireties.

REFERENCE SYMBOLS

10: measurement assistance plate, 11: clamp adapter plate, 12: measurement sample holding plate, 13: penetrating hole, 20: measurement sample, 21: wire, 22: covering, 31: lower clamp, 32: upper clamp

What is claimed is:

1. A modified polytetrafluoroethylene having units based on tetrafluoroethylene, units based on a monomer represented by the following formula (1) and units based on a monomer represented by the following formula (2),
   wherein:
   the content of the units based on the monomer represented by the formula (1) is from 0.020 to 0.040 mass % to all units of the modified polytetrafluoroethylene,
   the content of the units based on the monomer represented by the formula (2) is from 0.003 to 0.008 mass % to all units of the modified polytetrafluoroethylene:

$$CH_2 = CH - C_nF_{2n+1} \quad (1)$$

wherein n is an integer of from 2 to 6;

$$CF_2 = CFO(LO)_mRf \quad (2)$$

wherein L is a perfluoroalkylene group, Rf is a perfluoroalkyl group, and m is 0; and wherein the modified polytetrafluoroethylene provides an extrusion pressure change range in each of a first stage and a latter stage of from 0 to 5%, as determined by covering a wire with the modified polytetrafluoroethylene, in a region at a point of from 15 m to 25 m at the first stage, and in a region at a point of from 75 m to 85 m at the latter stage, and measuring a maximum spike peak width of a pressure change, divided by a baseline value of the immediately preceding pressure, expressed as a %.

2. The modified polytetrafluoroethylene according to claim 1, wherein the content of the units based on the monomer represented by the formula (1) is from 0.020 to 0.030 mass % to all units of the modified polytetrafluoroethylene, and
   the content of the units based on the monomer represented by the formula (2) is from 0.004 to 0.008 mass % to all units of the modified polytetrafluoroethylene.

3. The modified polytetrafluoroethylene according to claim 1, wherein the content of the units based on the monomer represented by the formula (1) is from 0.020 to 0.027 mass % to all units of the modified polytetrafluoroethylene, and
   the content of the units based on the monomer represented by the formula (2) is from 0.004 to 0.007 mass % to all units of the modified polytetrafluoroethylene.

4. The modified polytetrafluoroethylene according to claim 1, wherein the average primary particle size corresponding to D50 as measured by a laser scattering particle size distribution analyzer, is from 0.10 to 0.50 μm.

5. The modified polytetrafluoroethylene according to claim 1, wherein the standard specific gravity as obtained in accordance with ASTM D4895-04 is from 2.160 to 2.200.

6. The modified polytetrafluoroethylene according to claim 1, wherein the thermal instability index as obtained in accordance with ASTM D4895-04 is from 0 to 15.

7. The modified polytetrafluoroethylene according to claim 1, which is for paste extrusion.

8. A formed product formed by subjecting the modified polytetrafluoroethylene as defined in claim 1 to paste extrusion.

9. An electric wire covering material, which comprises the modified polytetrafluoroethylene as defined in claim 1.

10. An electric wire, which comprises a core wire and a covering layer comprising the electric wire covering material as defined in claim 9, covering the core wire.

11. A method for producing the modified polytetrafluoroethylene as defined in claim 1, the method comprising polymerizing tetrafluoroethylene, the monomer represented by the formula (1) and the monomer represented by the formula (2) to produce the modified polytetrafluoroethylene,
wherein the amount of the monomer represented by the formula (1) used is from 0.020 to 0.040 mass % to the total mass of all monomers, and
the amount of the monomer represented by the formula (2) used is from 0.003 to 0.008 mass % to the total mass of all monomers.

12. The method for producing the modified polytetrafluoroethylene according to claim 11, wherein the amount of the monomer represented by the formula (1) used is from 0.020 to 0.027 mass % to the total mass of all monomers, and the amount of the monomer represented by the formula (2) used is from 0.004 to 0.007 mass % to the total mass of all monomers.

13. The method for producing the modified polytetrafluoroethylene according to claim 11, wherein the polymerization is emulsion polymerization.

14. The method for producing the modified polytetrafluoroethylene according to claim 11, wherein the polymerizing comprises:
(c) polymerizing tetrafluoroethylene, the monomer represented by the formula (1) and the monomer represented by the formula (2) while charging tetrafluoroethylene to the reaction system in the absence of a chain transfer agent, and
(s), after charging at least 80 mass % of the entire amount of tetrafluoroethylene to be used for polymerization for the modified polytetrafluoroethylene to the reaction system, adding a chain transfer agent to the reaction system and further conducting polymerization in the presence of the chain transfer agent.

15. The method for producing the modified polytetrafluoroethylene according to claim 14, wherein in (c), at the time of the start of the polymerization, the entire amounts of the monomer represented by the formula (1) and the monomer represented by the formula (2) are present in the reaction system.

16. The modified polytetrafluoroethylene according to claim 1, which provides a white crack appearance frequency of at least 20, as determined by counting a number of white cracks in the region of the wire at the point of from 15 m to 25 m at the first stage, and dividing the length of the first stage in cm by the number of white cracks (1000 cm/number of white cracks).

17. The modified polytetrafluoroethylene according to claim 1, wherein the extrusion pressure change range in each of the first stage and the latter stage is of from 0 to 4%.

* * * * *